United States Patent
Le et al.

(10) Patent No.: US 8,344,867 B2
(45) Date of Patent: *Jan. 1, 2013

(54) SAFETY SYSTEM AND METHOD FOR A VEHICLE

(75) Inventors: Jialiang Le, Canton, MI (US); Todd Clark, Dearborn, MI (US); Manoharprasad K. Rao, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 785 days.

This patent is subject to a terminal disclaimer.

(21) Appl. No.: 12/499,267

(22) Filed: Jul. 8, 2009

(65) Prior Publication Data

US 2011/0006890 A1    Jan. 13, 2011

(51) Int. Cl.
*B60Q 1/00* (2006.01)
(52) U.S. Cl. .................. 340/440; 340/438
(58) Field of Classification Search .............. 340/440, 340/437, 438
See application file for complete search history.

(56) References Cited

U.S. PATENT DOCUMENTS

| | | | |
|---|---|---|---|
| 6,055,472 A | 4/2000 | Breunig et al. | |
| 6,282,474 B1 | 8/2001 | Chou et al. | |
| 6,611,784 B2 | 8/2003 | Tobaru et al. | |
| 6,618,655 B2 | 9/2003 | Tobaru et al. | |
| 6,625,564 B2 | 9/2003 | Mattes et al. | |
| 6,654,671 B2 | 11/2003 | Schubert | |
| 6,694,226 B2 | 2/2004 | Tobaru et al. | |
| 6,856,868 B1 * | 2/2005 | Le et al. | 701/38 |
| 7,057,503 B2 | 6/2006 | Watson | |
| 7,076,353 B2 | 7/2006 | Ogata et al. | |
| 7,136,730 B2 | 11/2006 | Lu et al. | |
| 7,162,343 B2 | 1/2007 | Subbian et al. | |
| 7,165,008 B2 | 1/2007 | Choi | |
| 8,019,511 B2 * | 9/2011 | Le et al. | 701/46 |
| 8,073,596 B2 * | 12/2011 | Le et al. | 701/45 |
| 8,086,376 B2 * | 12/2011 | Mccoy et al. | 701/46 |
| 2003/0182041 A1 * | 9/2003 | Watson | 701/45 |
| 2005/0159864 A1 * | 7/2005 | Ogata et al. | 701/38 |
| 2006/0041367 A1 | 2/2006 | Ono et al. | |
| 2006/0064218 A1 * | 3/2006 | Subbian et al. | 701/45 |
| 2006/0074534 A1 | 4/2006 | Geborek et al. | |
| 2007/0162204 A1 * | 7/2007 | Moshchuk et al. | 701/38 |
| 2008/0059021 A1 * | 3/2008 | Lu et al. | 701/36 |
| 2010/0228424 A1 * | 9/2010 | Clark et al. | 701/29 |
| 2011/0320091 A1 * | 12/2011 | Le et al. | 701/46 |

* cited by examiner

*Primary Examiner* — Travis Hunnings
(74) *Attorney, Agent, or Firm* — Frank A. MacKenzie; Brooks Kushman P.C.

(57) ABSTRACT

A system and method for activating a safety system when a vehicle may be involved in a spin, roll, and/or a spin-to-roll condition. The system and method include determining a side slip angle of the vehicle using the arctangent of the ratio of a lateral and longitudinal velocity. The system and method also include receiving a roll rate signal and determining a roll angle using the roll rate signal. The system and method also include determining a roll warning threshold that is a function of a relationship between the roll rate signal and the roll angle. Lastly, the system and method include activating the safety system when a side slip angle threshold and/or the roll warning threshold are exceeded.

15 Claims, 8 Drawing Sheets

SAFETY SYSTEM AND METHOD FOR A VEHICLE

BACKGROUND

1. Technical Field

One or more embodiments of the present disclosure relate to a system and method that may be used to determine when a vehicle is involved in a spin, roll, and/or a spin-to-roll condition that may result in a frontal, side, or roll-over impact crash.

2. Background Art

Vehicle manufacturers have continually worked to improve the advanced crash sensing and warning technologies (i.e., advanced crash systems) incorporated within a vehicle. These crash systems operate to continually monitor and provide advanced warnings about vehicle operation which may result in a potential crash scenario. However, advanced crash systems are typically added in addition to conventional crash systems located within the vehicle. As such, the advanced crash systems typically increase the cost and complexity of the vehicle.

DETAILED DESCRIPTION

As required, detailed embodiments of the present disclosure are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present disclosure. With reference to FIGS. 1-14, a more detailed description of one or more embodiments of the present disclosure will now be provided.

Figure 1:
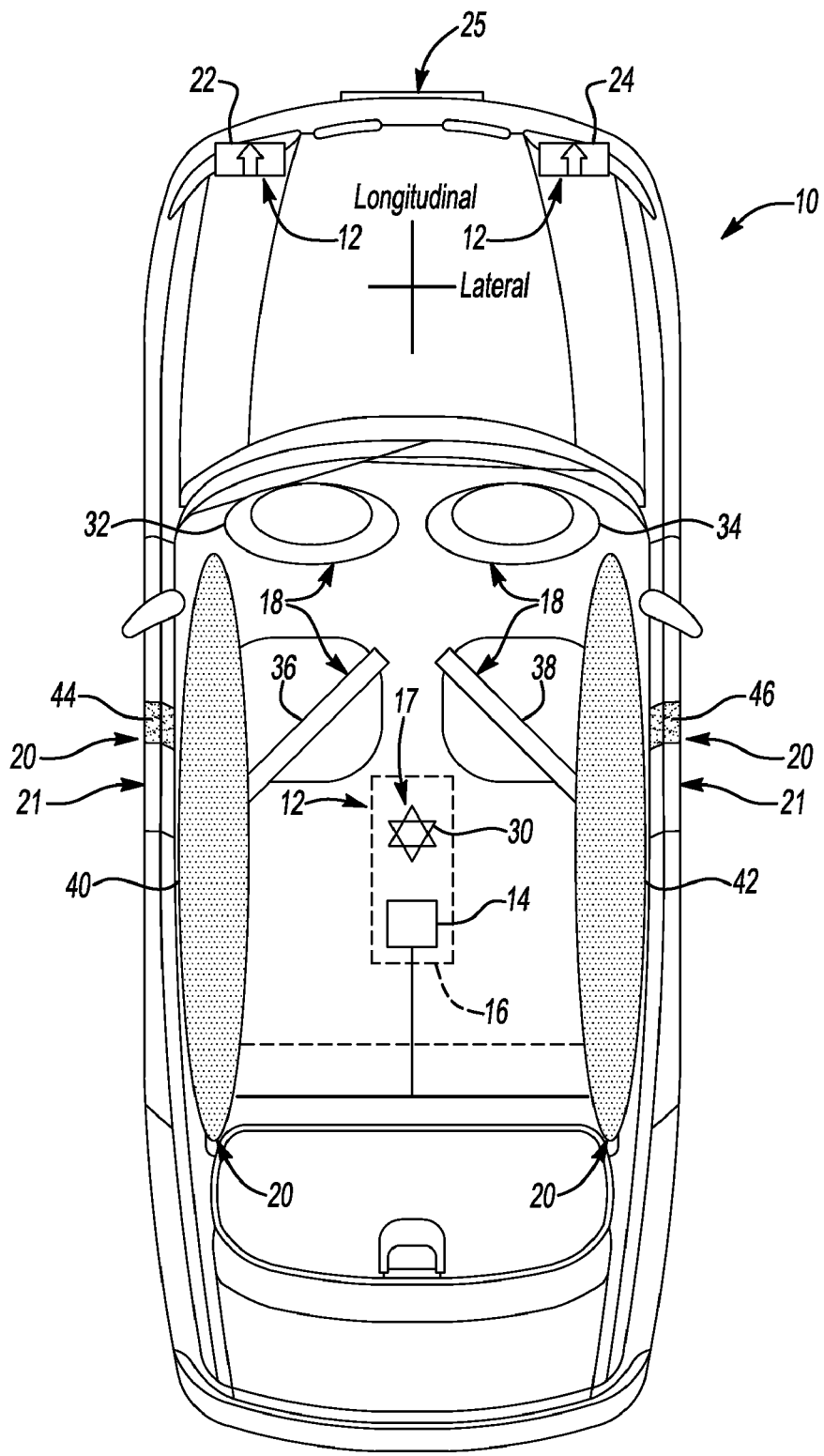
FIG. 1 is a top view of a vehicle that includes a number of crash sensors according to one non-limiting embodiment of the present disclosure.

FIG. 1 illustrates a top view of a vehicle 10 that includes a number of crash sensors 12. Vehicle 10 may include a controller 14 that operates to receive signals generated by the crash sensors 12 in order to determine if vehicle 10 is experiencing a spin, roll, or spin-to-roll condition that may result in a frontal, side, or roll-over crash. The controller 14 may be included within a restraint control module (RCM) 16 that is typically positioned at, or near, a central location 17 within vehicle 10.

The crash sensors 12 may generate and transmit signals indicative of vehicle acceleration, rotation, and other vehicle operating conditions. The signals generated by the crash sensors 12 may be used by the controller 14 in order to determine if vehicle 10 is experiencing a spin, roll, or spin-to-roll condition that may result in a frontal, side, or roll-over crash. If the controller 14 determines that vehicle 10 is experiencing a spin, roll, or spin-to-roll condition that may result in a frontal, side, or roll-over crash, the controller 14 may activate a number of frontal safety systems 18, side and/or rollover safety systems 20, 36 and 38.

More particularly, the crash sensors 12 incorporated within vehicle 10 may include a pair of frontal sensors 22, 24 that are positioned about, or near, a front end 25 of vehicle 10. The frontal sensors 22, 24 may operate to provide the controller 14 with a pair of acceleration signals indicative of acceleration along a longitudinal axis about the front end 25 of vehicle 10. Furthermore, the controller 14 may use the acceleration signals received from the pair of frontal sensors 22, 24 in order to determine whether a frontal impact crash has occurred.

Vehicle 10 may further include an inertial measurement unit (IMU) sensor 30 that may be positioned near or about a central location 17 of vehicle 10. The IMU sensor 30 may be configured to measure the acceleration of vehicle 10 along the longitudinal, lateral, and vertical direction. The IMU sensor 30 may further be configured to measure the angular velocity of vehicle 10 about the longitudinal, lateral and vertical axis. However, the present disclosure contemplates that the acceleration and angular velocity of vehicle 10 may be measured using any other suitable sensor which may be incorporated within vehicle 10.

Vehicle 10 may also include frontal safety systems 18 and/or side safety systems 20. The frontal safety systems may include a pair of frontal airbags 32, 34, and/or a pair of seatbelt pretensioning systems 36, 38. The side safety systems 20 may include a pair of overhead side curtain airbags 40, 42 which may typically be deployed during a side and/or rollover crash. The side safety systems 20 may also include a pair of side airbags 44, 46 which may be located at or near a side end 21 of vehicle 10. Furthermore, the pair of side airbags 44, 46 may be deployed only during a side crash. However, one or more embodiments contemplates that other front, side, and overhead safety systems may be included within vehicle 10 in order to protect an occupant during a frontal, side, or roll-over crash.

Figure 2:
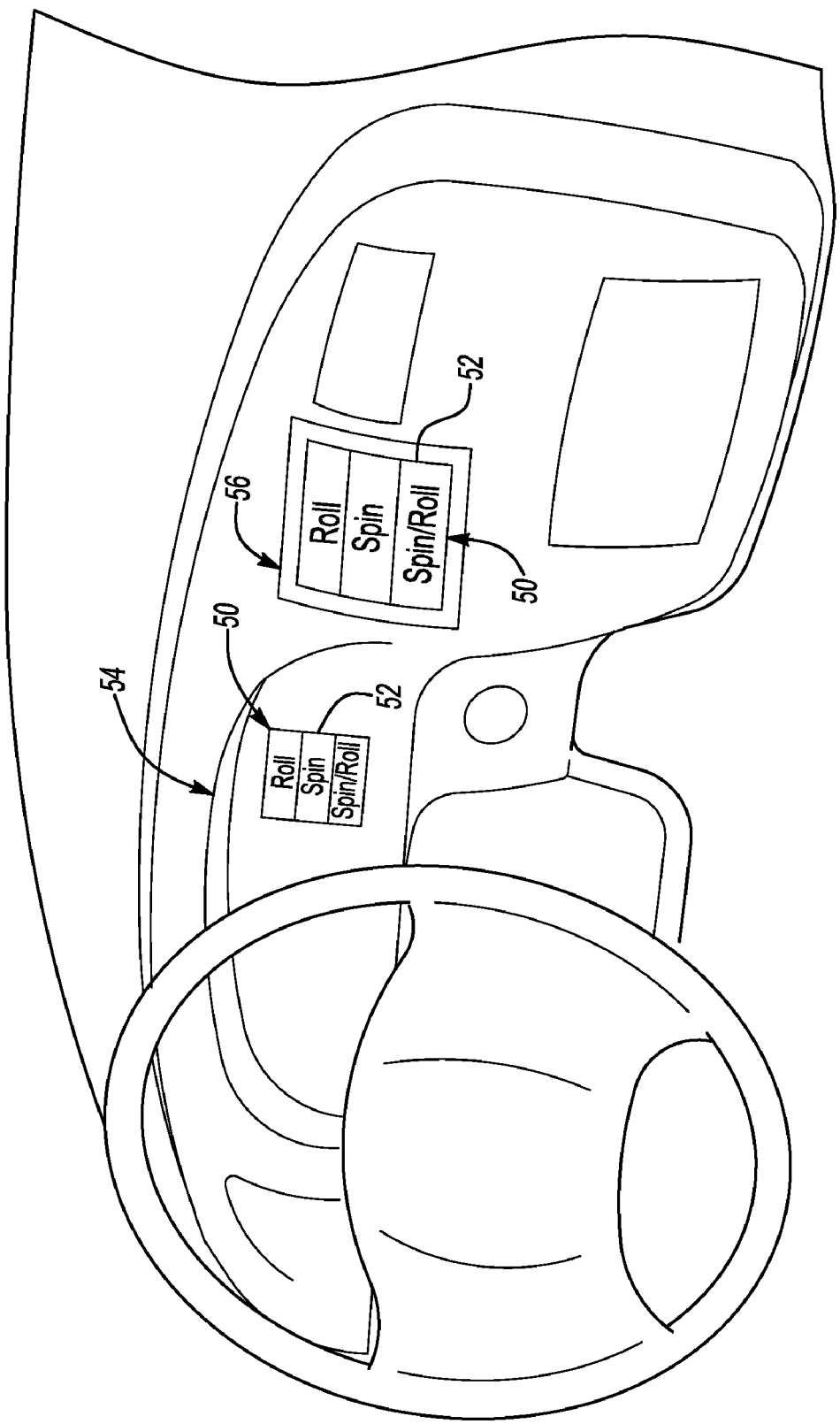
FIG. 2 is a view of a vehicle warning system according to one non-limiting embodiment of the present disclosure.

FIG. 2 illustrates a number of emergency warning systems 50 that may be included within vehicle 10. The emergency warning systems 50 may include one or more visual warning systems 52 and/or one or more audible warning systems (not shown). For example, the one or more visual warning systems 52 may be activated by the controller 14 so as to appear on a dashboard counsel 54 and/or a center counsel 56 and visually warn a driver that vehicle 10 may be entering into a spin, roll, or spin-to-roll condition. Upon being visually and/or audibly warned, the driver may adjust the operation of vehicle 10 in order to reduce the possibility of vehicle 10 entering into a spin, roll, or spin-to-roll condition.

Figure 3:
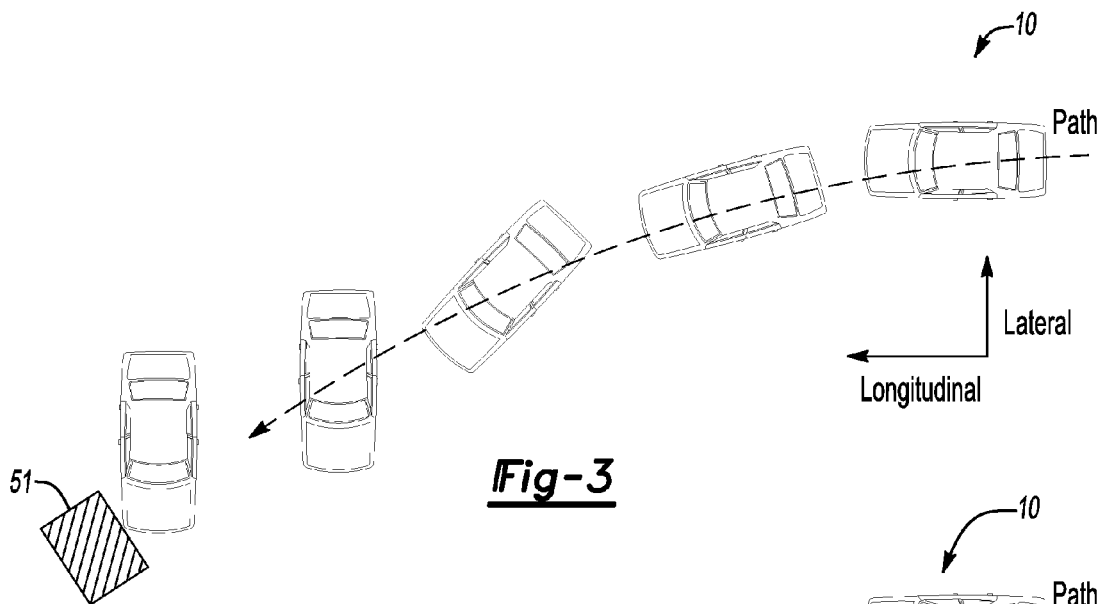
FIG. 3 is a top view of a vehicle during a spin condition according to one non-limiting embodiment of the present disclosure.
Figure 4:
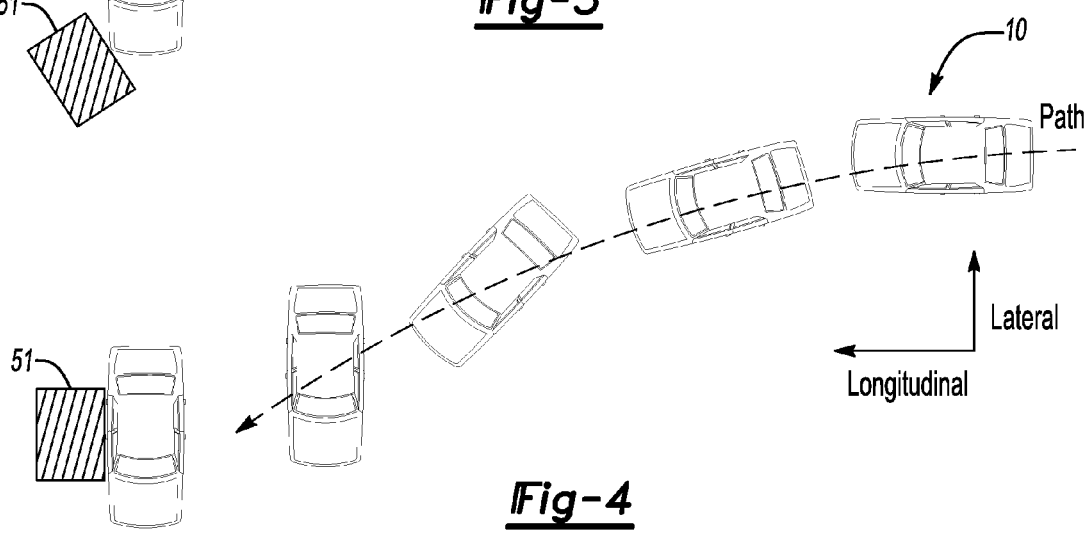
FIG. 4 is another top view of the vehicle during a spin condition according to one non-limiting embodiment of the present disclosure.

FIGS. 3 and 4 illustrate a number of various spin conditions that vehicle 10 may experience. FIG. 3 illustrates a spin condition that ultimately results in a frontal impact crash. More particularly, FIG. 3 illustrates vehicle 10 traveling along a path in a longitudinal direction. Vehicle 10 may begin to side-slip (i.e., rotate) in a lateral direction while forward velocity continues in the longitudinal direction. As a result of the side-slip rotation, vehicle 10 may collide with an obstacle 51 (e.g., a tree) on or near the front end 25 of vehicle 10.

FIG. 4 also illustrates vehicle 10 entering into a spin condition while traveling along a path in a longitudinal direction. Again, a spin condition may result when vehicle 10 side-slips in a lateral direction while forward velocity continues in the longitudinal direction. In addition, due to the side-slip rotation, vehicle 10 may collide with the obstacle 51. However, FIG. 4 illustrates that the side-slip rotation of vehicle 10 may be greater than that illustrated in FIG. 3 so that vehicle 10 is involved in a side impact crash (e.g., collides with the obstacle 51 on the side end 21 of vehicle 10).

One non-limiting example of the spin conditions illustrated in FIGS. 3 and 4 may occur when the driver turns the steering wheel of vehicle 10 too aggressively thereby causing vehicle 10 to lose positive traction control so as to result in a frontal or side impact crash. Alternatively, another non-limiting example of the spin conditions illustrated in FIGS. 3 and 4 may occur when the driver accelerates or decelerates vehicle 10 too aggressively while navigating a turn, again losing positive traction control thereby resulting in a frontal or side impact crash.

Figure 5:
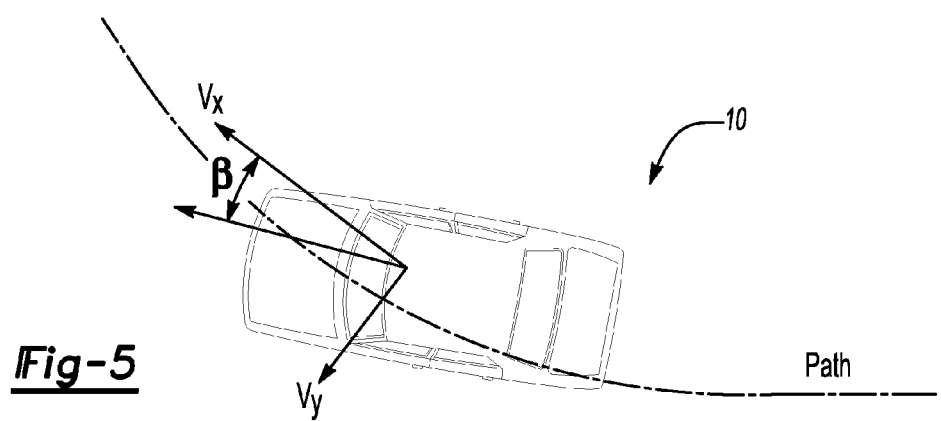
FIG. 5 is a top view of the vehicle that illustrates the side-slip angle and lateral and longitudinal velocities according to one non-limiting embodiment of the present disclosure.

FIG. 5 illustrates the relationship between the side-slip angle (β) and the longitudinal and lateral velocities ($v_x$ and $v_y$) of vehicle 10 during a spin condition, as illustrated in FIGS. 3-4 above. The side-slip angle may be determined by the controller 14 using the following, exemplary equation:

$$\beta = \arctan\left(\frac{v_y}{v_x}\right) \quad (1)$$

where,
β is the side-slip angle;
$v_x$ is the longitudinal velocity of vehicle 10; and
$v_y$ is the lateral velocity of vehicle 10.

As illustrated by Equation (1), the side-slip angle of vehicle 10 may be expressed as the angle equal to the arc tangent of the ratio between the vehicle speed relative to path along the lateral axis ($v_y$) and the vehicle speed relative to the path along the longitudinal axis ($v_x$). However, in order to calculate the side-slip angle, the controller 14 may need to determine the longitudinal and lateral velocities. The present disclosure contemplates that the longitudinal and lateral velocities may be determined using the signals from the IMU sensor 30. More particularly, the IMU sensor 30 may transmit acceleration and angular velocity signals about the longitudinal, lateral and vertical directions to the controller 14. The controller 14 may use the kinematic relationships between the transmitted IMU sensor signals by using the following, exemplary equations:

$$\dot{v}_x = a_x + w_x v_y - w_y v_x + (g^* \sin(\theta_y)) \quad (2)$$

$$\dot{v}_y = a_y - w_z v_x + w_x v_z + (g^* \sin(\theta_x)^* \cos(\theta_y)) \quad (3)$$

$$\dot{v}_z = a_z - w_x v_y + w_y v_x + (g^* \cos(\theta_x)^* \cos(\theta_y)) \quad (4)$$

where,
$\dot{v}_x, \dot{v}_y, \dot{v}_z$ are the determined longitudinal, lateral and vertical velocity rates;
$v_x, v_y, v_z$ are the longitudinal, lateral and vertical velocities of vehicle 10;
$a_x, a_y, a_z$ are the longitudinal, lateral and vertical accelerations of vehicle 10;
$\omega_x, \omega_y, \omega_z$ are the longitudinal, lateral and vertical angular velocities of vehicle 10;
$\theta_x, \theta_y, \theta_z$ are the roll, pitch, and yaw angles of vehicle 10; and
g is the gravitational acceleration of the earth (e.g., standard gravity or 9.80665 m/s²)

The present disclosure further contemplates that when the pitch angle ($\theta_y$) is minimal (e.g., less than 8 degrees), Equations (2)-(4) may be determined by the controller 14 using the following simplified, exemplary set of equations:

$$\dot{v}_x = a_x + w_z v_y - w_y v_x \quad (5)$$

$$\dot{v}_y = a_y - w_z v_x + w_x v_z + (g^* \sin(\theta_x)) \quad (6)$$

$$\dot{v}_z = a_z - w_x v_y + w_y v_x + (g^* \cos(\theta_x)) \quad (7)$$

Figure 6:
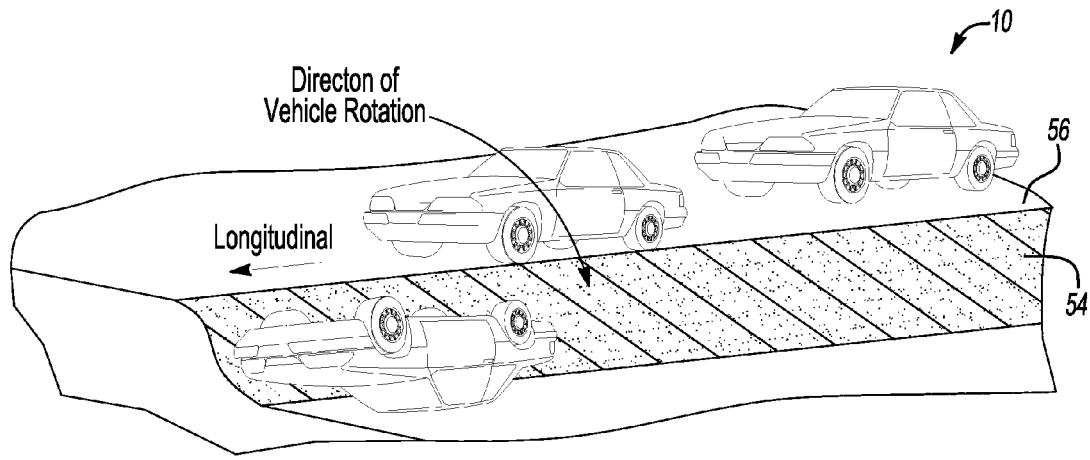
FIG. 6 is a perspective view of the vehicle during a roll condition according to one non-limiting embodiment of the present disclosure.
Figure 7:
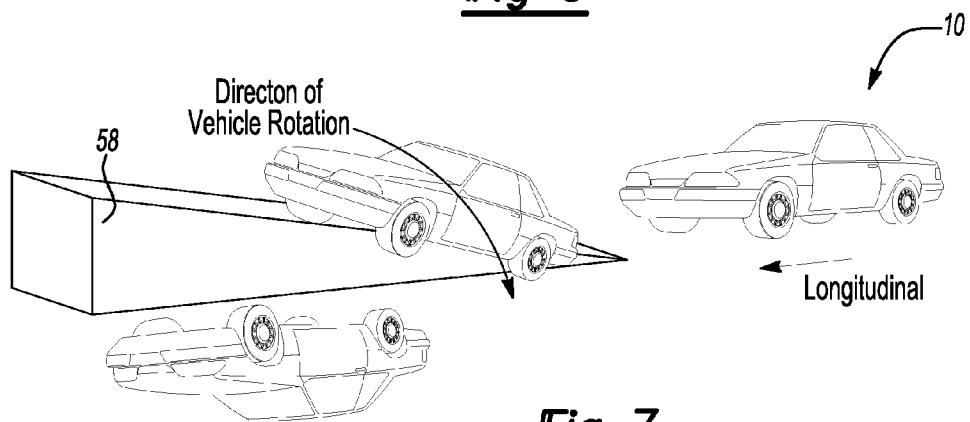
FIG. 7 is another perspective view of the vehicle during a roll condition according to one non-limiting embodiment of the present disclosure.

With reference back to the drawings, FIGS. 6 and 7 illustrate vehicle 10 during a roll condition. With reference to FIG. 6, a conventional "fall-over" condition is illustrated wherein a lateral overturning of vehicle 10 results from one or more of the left or right wheels of vehicle 10 stepping onto an embankment 54. As illustrated, the embankment 54 may be on a declined angle from a surface 56. In one non-limiting example, the fall-over condition may occur when one or more of the left or right wheels of vehicle 10 step onto the embankment 54 from the surface 56 and the driver attempts to aggressively adjust the operation of vehicle 10 back towards the surface 56. Due to such aggressive operation, vehicle 10 may over-turn in a lateral direction thereby resulting in a roll-over crash.

Alternatively, FIG. 7 illustrates a conventional "flip-over" condition which may occur when a lateral over-turning results from one or more of the left or right wheels of vehicle 10 climbing onto an inclined obstacle 58. One non-limiting example of a flip-over condition may occur when vehicle 10 proceeds onto the inclined obstacle 58 and one side of vehicle 10 is elevated at such an acute angle that a roll-over crash results.

Figure 8:
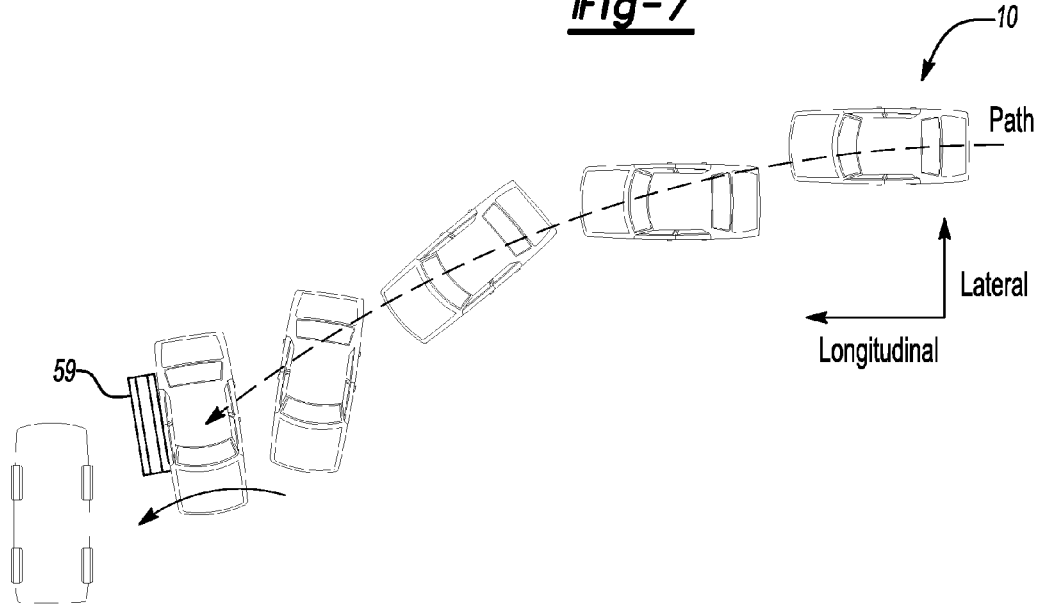
FIG. 8 is a top view of a vehicle during a spin-to-roll condition according to one non-limiting embodiment of the present disclosure.
Figure 9:
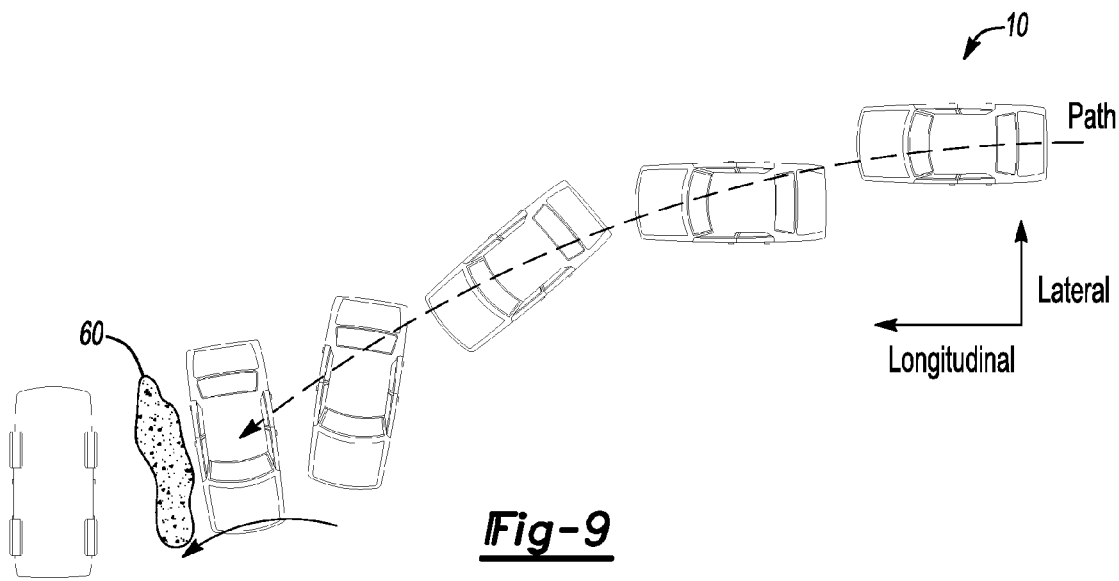
FIG. 9 is another top view of a vehicle during a spin-to-roll condition according to one non-limiting embodiment of the present disclosure.

FIGS. 8 and 9 illustrate the vehicle during a spin condition that results in a roll condition (e.g., spin-to-roll condition). The spin-to-roll condition illustrated may occur when vehicle 10 involved in a spin condition produces sufficient roll kinetic energy. For example, FIG. 8 illustrates vehicle 10 traveling along a path in a longitudinal direction. Vehicle 10 may begin to side-slip in a lateral direction while forward momentum continues in a longitudinal direction. However, unlike FIGS. 3-4, vehicle 10 may produce sufficient roll kinetic energy as a result of a "hard trip" roll over. The "hard trip" roll over may result when the side end 21 of vehicle 10 collides, or trips, upon an obstacle 59 (e.g., a curb). The height of the obstacle 59 may be at such a minimal level (e.g., several inches to a foot) that vehicle 10 generates sufficient roll kinetic energy thereby resulting in a roll-over crash.

With reference to FIG. 9, the spin-to-roll condition may also occur as a result of a conventional "soft trip" roll-over condition. The "soft trip" roll-over condition may occur when the right or left wheels of vehicle 10 travel upon a surface while vehicle 10 is side-slipping in a longitudinal direction along a path. Furthermore, the soft trip roll-over condition illustrated in FIG. 9 may occur when vehicle 10 produces sufficient roll kinetic energy due to tripping upon a surface 60 having a relatively high friction coefficient, such as grass, soft dirt or mud, sand, gravel, pebbles, or the like.

Figure 10:
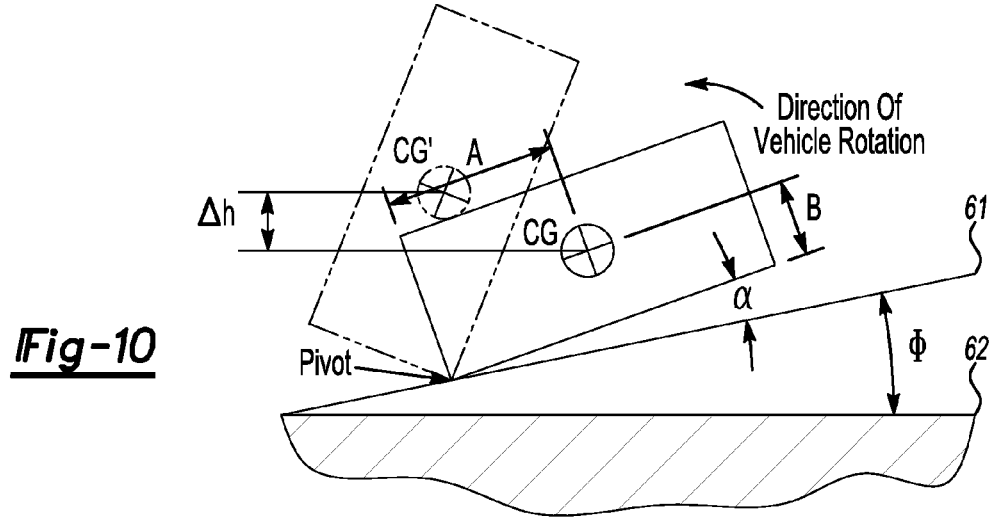
FIG. 10 is a rear view illustration of a vehicle rotation according to one non-limiting embodiment of the present disclosure.

With reference to FIG. 10, a simplified model is illustrated for determining the roll conditions shown in FIGS. 6-9. As illustrated, a pivot point (e.g., rotational axis) may exist around a lower corner of vehicle 10. FIG. 10 further illustrates a roll (e.g., rotational) angle ($\alpha$) indicative of the angle a vehicle 10 may have rotated off an embankment 61. Furthermore, the embankment 61 may also have an inclination angle ($\phi$) indicative of the angle of the inclination of the embankment 61 with respect to a surface 62. The controller 14 may also determine a special vehicle angle ($\delta$) that may be used to assess when the lateral rotation of vehicle 10 is severe enough that a roll condition may results. The controller 14 may determine the special vehicle angle using the following, exemplary equation:

$$\delta = \arctan\left(\frac{B}{A}\right) \quad (8)$$

where,
$\delta$ is the determined special vehicle angle;
A is a value that is indicative to half the width of vehicle 10; and
B is a value that is indicative of the distance from a bottom portion of the vehicle to a center of gravity point (CG) of the vehicle.

The controller 14 may further receive a roll-rate ($\omega_x$) of vehicle 10 from the IMU sensor 30 or any other suitable rotational sensor that may be incorporated within vehicle 10. The controller 14 may use the received roll-rate in order to determine the roll angle of vehicle 10. Furthermore, a roll-rate and roll angle threshold may be determined by the controller 14 using the principle of energy conservation and stable equilibrium considerations as illustrated by exemplary equations 9 through 20.

$$KE=PE \quad (9)$$

where,
KE is the rotational kinetic energy of vehicle 10; and
PE is the potential energy reserve of vehicle 10.

The rotational kinetic energy illustrated in Equation (9) may be expressed in terms of the moment of inertia about the pivot point illustrated in FIG. 10. The rotational kinetic energy may further be expressed in terms of the vehicle's moment of inertia using the following, simplified equation:

$$KE = \frac{1}{2}(I_{pivot} * \omega_x^2) \quad (10)$$

where,
KE is the rotational kinetic energy of vehicle 10;
$I_{pivot}$ is a moment of inertia about the pivot point of vehicle 10; and
$\omega_x$ is a roll rate of the vehicle about a longitudinal axis of vehicle 10.

The moment of inertia illustrated in Equation (10) may further be expressed as a moment of inertia about the CG of vehicle 10 using the following, exemplary equation:

$$I_{pivot} = I_{Center} + m(A^2 + B^2) \quad (11)$$

where,
$I_{pivot}$ is the moment of inertia about the pivot point of vehicle 10;
$I_{center}$ is the moment of inertia about the CG of vehicle 10;
m is the mass of vehicle 10;
A is the value that is indicative to half the width of vehicle 10; and
B is the value that is indicative of the distance from a bottom portion of the vehicle to a center of gravity location (CG) of vehicle 10.

With reference back to Equation (9), the potential energy reserve may be further expressed using the following, exemplary equation:

$$PE = mg * \Delta h \quad (12)$$

where,
PE is the determined potential energy reserve of vehicle 10;
m is the mass of vehicle 10;
g is the gravitational acceleration of the earth (e.g., standard gravity or 9.80665 m/s$^2$); and
$\Delta h$ is a delta distance of vehicle 10 during a roll condition.

As illustrated by FIG. 10, the delta distance of vehicle 10 may be the distance between a current center of gravity location (CG) of vehicle 10 and a critical stability center of gravity location (CG') of vehicle 10. The delta distance of vehicle 10 may be further expressed using the following, exemplary equation:

$$\Delta h = (1 - \sin(\alpha + \phi + \delta)) * \sqrt{A^2 + B^2} \quad (13)$$

where,
$\Delta h$ is the determined delta distance of a vehicle 10 during a roll condition;
A is a value that is indicative to half the width of vehicle 10;
B is a value that is indicative of the distance from a bottom portion of the vehicle to a center of gravity point (CG) of the vehicle;
$\alpha$ is the roll angle of vehicle 10;
$\phi$ is the inclination angle; and
$\delta$ is the determined special vehicle angle.

Equations (10)-(13) may be substituted back into Equation (9) so that a relation between roll angle and roll rate may be expressed using the following, exemplary equation:

$$\frac{1}{2}(I_{Center} + m(A^2 + B^2)) * \omega_x^2 = mg * (1 - \sin(\alpha + \phi + \delta)) * \sqrt{A^2 + B^2} \quad (14)$$

With reference to Equation (14), if a maximum roll angle is reached when the roll rate is zero, the maximum roll angle may be determined by the controller 14 using the following, exemplary equation:

$$\alpha_{max} = (90 - \delta) - \phi \quad (15)$$

where,
$\alpha_{max}$ is the maximum roll angle of vehicle 10;
$\delta$ is the special vehicle angle of vehicle 10; and
$\phi$ is the inclination angle.

In general, the inclination or embankment angle (φ) may be difficult to determine. As such, the inclination or embankment angle may be neglected from further consideration even though a possible reduction in system performance of vehicle 10 may occur. However, the inclination or embankment angle information may be used in the event that it may be readily or easily obtainable. For example, the inclination or embankment angle information may be used if accurate digital maps and/or vehicle navigational state information is available.

With reference back to Equation (14), if a maximum roll rate is reached when the roll angle is zero, the maximum roll rate may be determined by the controller 14 using the following, exemplary equation:

$$\omega_{max} = \sqrt{\frac{mg*(1-\sin(\phi+\delta))*\sqrt{A^2+B^2}}{\frac{1}{2}(I_{Center}+m(A^2+B^2))}} \quad (16)$$

In addition, by implementing conventional regression analysis, Equation (14) may further be simplified to a first degree polynomial equation so that the relationship between roll rate and roll angle of vehicle 10 may be determined by the controller 14 using the following, exemplary equation:

$$\alpha=(a*\omega_x)+b \quad (17)$$

where,

α is the roll angle of vehicle 10;

a is a constant slope value;

$\omega_x$ is the roll rate of vehicle 10 about a longitudinal axis of vehicle 10; and b is a constant intercept value.

The present disclosure contemplates that the constant slope value and constant intercept values (a, b) may be predetermined and may further be representative of characteristics of vehicle 10. As such, the constant slope value and constant intercept value may be predetermined through testing and may vary depending upon the vehicle make and/or model.

The present disclosure further contemplates that the constant slope and intercept values illustrated in Equation (17) may be further expressed using the following, exemplary equations:

$$a = \frac{-\alpha_{max}}{\omega_{max}} \quad (18)$$

$$b = \alpha_{max} \quad (19)$$

where, a is the constant slope value;

b is the constant intercept value;

$\alpha_{max}$ is the maximum roll angle of vehicle 10 (e.g., as determined using Equation (15)); and $\omega_{max}$ is the maximum roll rate of vehicle 10 (e.g., as determined using Equation (16)).

By combining Equations (14)-(19), a relationship between roll rate and roll angle of vehicle 10 may be determined by the controller 14 using the following simplified, exemplary equation:

$$\alpha=c*(a*\omega_x)+(d*b) \quad (20)$$

where,

α is the roll angle of vehicle 10;

c is a first roll-over value.

a is the constant slope value;

$\omega_x$ is the maximum roll rate of vehicle 10;

b is the constant intercept value; and d is a second roll-over value.

The present disclosure contemplates that the first and second roll-over value may be set by the controller 14. As such, the controller 14 may use the roll-over values to increase the sensitivity of determining a potential roll-over condition. For example, the controller 14 may lower the roll-over values thereby increasing the warning range of a potential roll-over condition. As such, the controller 14 may activate the emergency warning systems 50 at a time earlier than if the roll-over values were set to a higher value.

Furthermore, the functional relationship between roll rate and roll angle illustrated above in Equation (20) may be used as a roll warning threshold that may allow the controller 14 to monitor a potential roll condition of vehicle 10. If the controller 14 determines that the roll warning threshold of Equation (20) has been exceeded, the controller 14 may be able to provide advanced warning to the driver so that operation of vehicle 10 may be modified thereby minimizing and/or eliminating the potential roll-over condition. In addition, if the controller 14 determines that the roll warning threshold of Equation (20) has been exceeded, the controller 14 may activate one or more of the reversible restraint systems, such as, seatbelt pre-tensioning systems, 36 and 38.

Figure 11:
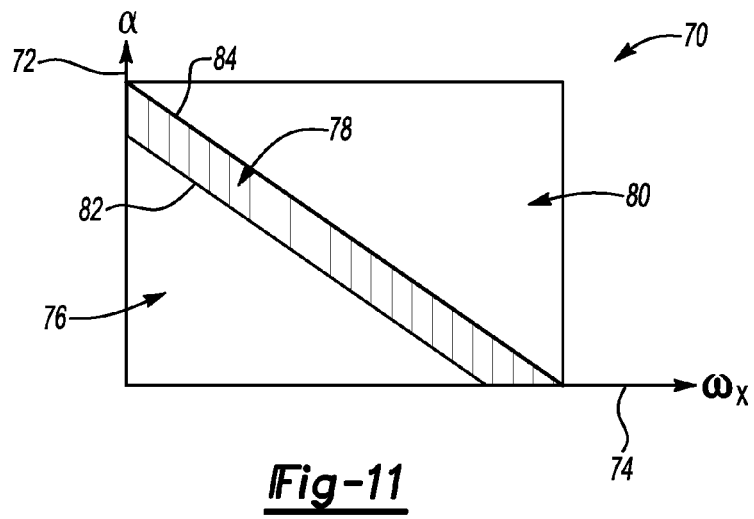
FIG. 11 is an exemplary graph illustrating the relationship between roll rate and roll angle according to one non-limiting embodiment of the present disclosure.

FIG. 11 is an exemplary graph 70 that illustrates the relationship between roll-rate and roll angle. As illustrated the graph 70 includes a vertical axis 72 that is representative of the roll angle of vehicle 10. The graph 70 further includes a horizontal axis 74 that is representative of the roll rate of vehicle 10.

The graph 70 further includes a stable zone 76 that is representative of when vehicle 10 is being operated in a manner which does not indicate a potential roll condition. In addition, the graph 70 includes a warning zone 78 that is representative of when vehicle 10 is being operated in a manner which has the potential to result in a roll condition. Lastly, the graph 70 includes a roll zone 80 that is representative of when vehicle 10 is entering into or has experienced a roll condition.

The graph 70 further includes a warning threshold 82 that is representative of roll warning threshold explained above. The present disclosure contemplates that the warning zone 78 may be adjusted by the controller 14 by adjusting the roll warning threshold using Equation (20). The controller 14 may adjust the roll warning threshold by increasing or decreasing the first and second roll-over values (c, d). In turn, the warning threshold 82 may be adjusted thereby increasing or decreasing the size of the warning zone 78.

Furthermore, by lowering the warning threshold 82 the driver may modify operation of vehicle 10 in order to reduce and/or negate the roll-conditions illustrated in FIGS. 7-10. For example, if the visual warning system 52 displays to the driver a roll or spin-to-roll condition warning indicator due to the current operation of vehicle 10, the driver may begin braking or adjust operation of vehicle 10. In turn, vehicle 10 may not be involved in a roll or spin-to-roll condition that results in a roll-over crash. Also, if the controller 14 determines that the threshold 82 has been exceeded, the controller 14 may activate reversible restraints, such as, seat belt pre-tensioning systems 36 and 38.

Figure 12:
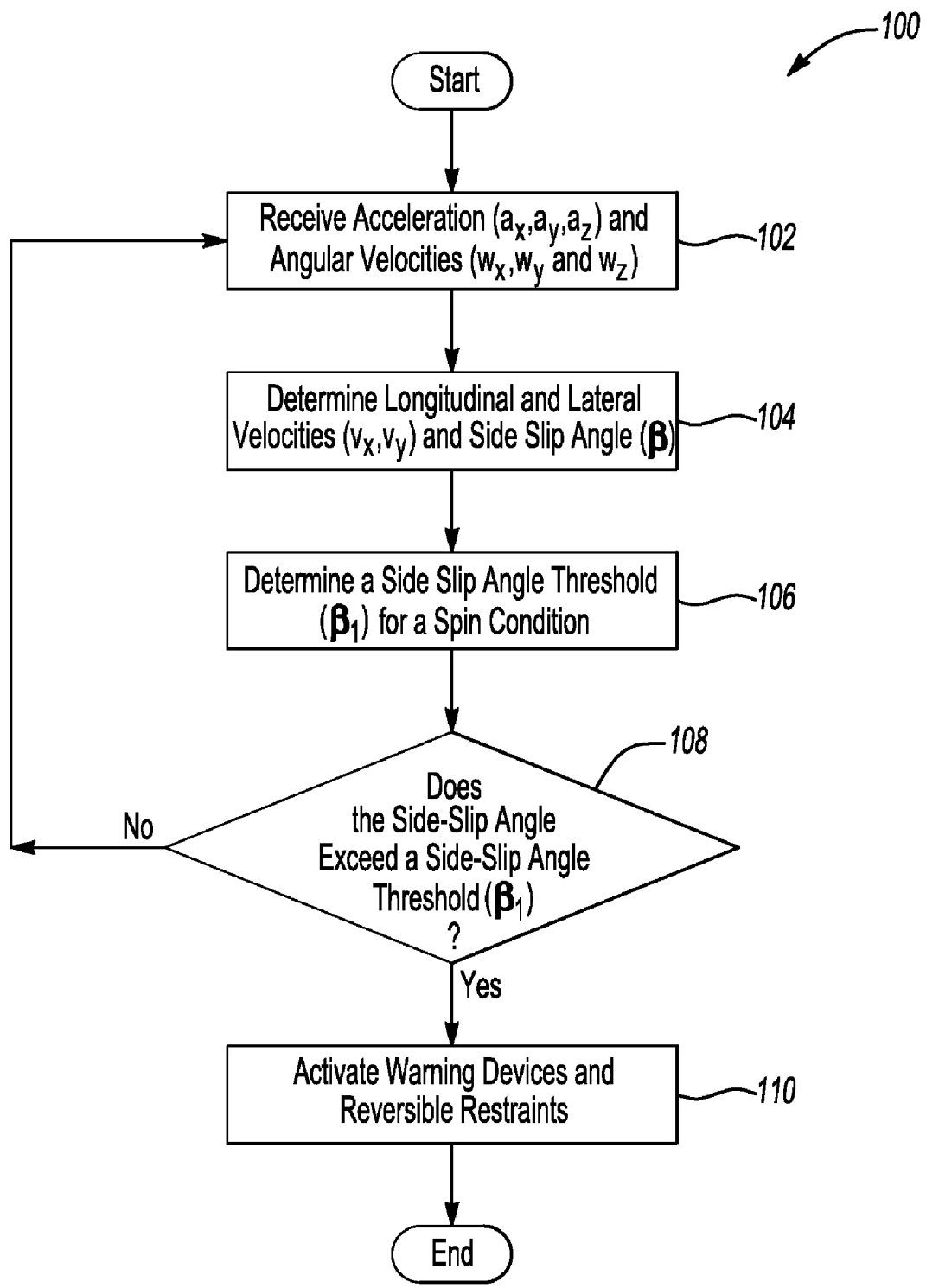
FIG. 12 is an exemplary flow chart illustrating a spin condition according to one non-limiting embodiment of the present disclosure.

With reference back to the drawings, FIG. 12 is an exemplary, flow diagram 100 according to one or more embodiments of the present disclosure. However, it should be noted that the flow diagram 100 illustrated in FIG. 12 is merely exemplary, and the operation, function, or steps of the method may be performed in a fashion other than the order described herein. The flow diagram 100 illustrated may be used by the controller 14 in order to determine a spin condition that may result in a frontal and/or side impact crash as described above with reference to FIGS. 3-5.

The flow diagram 100 may begin at operation 102 where the controller 14 may receive signals indicative of the longitudinal, lateral, and vertical accelerations ($a_x$, $a_y$, $a_z$) and the angular velocities about the longitudinal, lateral, and vertical axis ($\omega_x$, $\omega_y$, $\omega_z$) from the IMU sensor 30 or any other suitable sensor system. Upon receiving the acceleration and angular velocity signals, the flow diagram 100 proceeds to operation 104.

In operation 104, the controller 14 may determine the longitudinal and lateral velocities ($v_x$, $v_y$) and the side-slip angle ($\beta$) using Equations (1)-(7) explained above. Upon determining the longitudinal and lateral velocities and the side-slip angle, the flow diagram 100 proceeds to operation 106.

In operation 106, the controller 14 may determine a side-slip angle threshold ($\beta_1$) indicative of a spin condition. The present disclosure contemplates that the side-slip angle threshold ($\beta_1$) may vary depending upon the make, model, or other characteristics of a particular vehicle. As such, the side-slip angle threshold ($\beta_1$) for a specific vehicle may be established through experimentation and/or mathematical modeling. For example, through experimentation it may be established that vehicle 10 may have a side-slip angle threshold ($\beta_1$) of 30 degrees. Correspondingly, during operation 106, the controller 14 may use a look-up table to determine that the side-slip angle ($\beta_1$) for vehicle 10 is 30 degrees. Once the side-slip angle threshold ($\beta_1$) is determined, the flow diagram 100 proceeds to operation 108.

In operation 108, the controller 14 may determine if the side-slip angle ($\beta$) exceeds the side-slip angle threshold ($\beta_1$). If the controller 14 determines that the side-slip angle ($\beta_1$) exceeds the side-slip angle threshold ($\beta_1$), then the flow diagram 100 proceeds to operation 110. However, if the controller 14 does not determine that the side-slip angle ($\beta$) exceeds the side-slip angle threshold ($\beta_1$) the flow diagram 100 proceeds back to operation 102.

In operation 110, the controller 14 may activate the emergency warning systems 50 in order to visually and/or audibly warn the driver of a potential spin condition. By visually and/or audibly warning the driver of a potential spin condition, the driver may modify operation of vehicle 10 in order to reduce and/or negate the spin conditions illustrated in FIGS. 3 and 4. For example, if the driver is visually warned by the emergency warning system 50 that a potential spin condition may occur, the driver may reduce the speed of vehicle 10 and/or reduce the degree of the turning radius of vehicle 10 in order to avoid the potential spin condition. In turn, vehicle 10 may not be involved in a spin condition that results in a frontal and/or side impact crash. The controller 14 may also activate a number of reversible elements of the frontal, side and/or rollover safety systems 18, 20. For example, the controller 14 may activate the seatbelt pre-tensioning systems 36, 38

Figure 13:
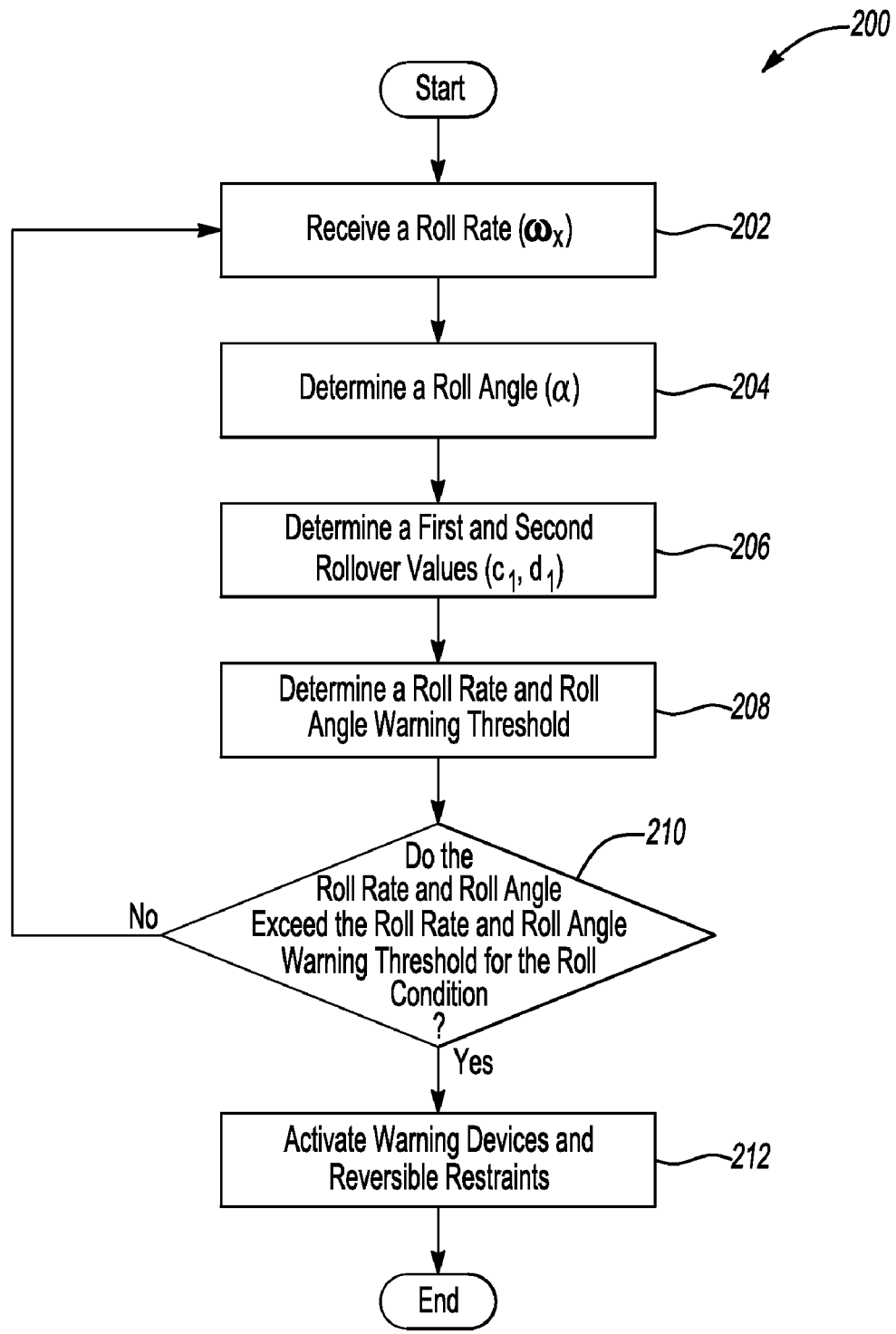
FIG. 13 is an exemplary flow chart illustrating a roll condition according to one non-limiting embodiment of the present disclosure.

With reference back to the drawings, FIG. 13 is an exemplary, flow diagram 200 according to one or more embodiments of the present disclosure. However, it should be noted that the flow diagram 200 illustrated in FIG. 13 is merely exemplary, and the operation, function or steps of the method may be performed in a fashion other than the order described herein. The flow diagram 200 illustrated may be used by the controller 14 in order to determine a roll condition that may result in a roll-over crash as described above with reference to FIGS. 6-7.

The flow diagram 200 may begin at operation 202 were the controller 14 may receive the roll rate ($\omega_x$) from the IMU sensor 30 or any other suitable sensor system. Once the roll rate is received by the controller 14 the flow diagram 200 proceeds to operation 204.

In operation 204, the controller 14 may determine the roll angle ($\alpha$). The present disclosure contemplates that in one non-limiting example, the roll angle may be determined by the integration of roll rate ($\omega_x$). Once the roll angle is determined, the flow diagram 200 proceeds to operation 206.

In operation 206, the controller 14 may determine a first and second roll-over value ($c_1$, $d_1$). As stated above, the roll-over values ($c_1$, $d_1$) may be chosen in order to lower or raise the warning threshold as determined using Equation (20). The present disclosure contemplates that the roll-over values ($c_1$, $d_1$) may vary depending upon the make, model, or other characteristics of a particular vehicle. As such, the roll-over values ($c_1$, $d_1$) for a specific vehicle may be established through experimentation and/or mathematical modeling. Once the roll-over values ($c_1$, $d_1$) are determined by the controller 14 the flow diagram 200 proceeds to operation 208.

In operation 208, the controller 14 may determine the roll rate and roll angle warning threshold indicative of a potential roll condition. The present disclosure contemplates that the controller 14 may determine the roll rate and roll angle warning threshold using Equation (20) and the roll-over values ($c_1$, $d_1$) determined in operation 206. As explained above, the warning threshold may be raised or lowered using the roll-over values ($c_1$, $d_1$). Once the roll rate and roll angle warning threshold is determined by the controller 14 flow diagram 200 proceeds to operation 210.

In operation 210, the controller 14 may determine if the roll rate and roll angle warning threshold has been exceeded. If the controller 14 determines the roll rate and roll angle warning threshold is not exceeded, the flow diagram 200 proceeds back to operation 202. However, if the controller 14 determines that the roll rate and roll angle warning threshold has been exceeded, the flow diagram 200 proceeds to operation 212.

In operation 212, the controller 14 may activate the emergency warning systems 52 in order to visually and/or audibly warn the driver of a potential roll condition. By visually and/or audibly warning the driver of a potential roll condition, the driver may begin braking or adjusting operation of vehicle 10 in order to avoid the potential roll condition. In turn, vehicle 10 may not be involved in a roll condition that results in a roll-over impact crash. In addition, the controller 14 may activate a number of reversible elements of the frontal, side and/or rollover safety systems 18, 20. For example, the controller 14 may activate the seatbelt pre-tensioning systems 36, 38.

Figure 14:
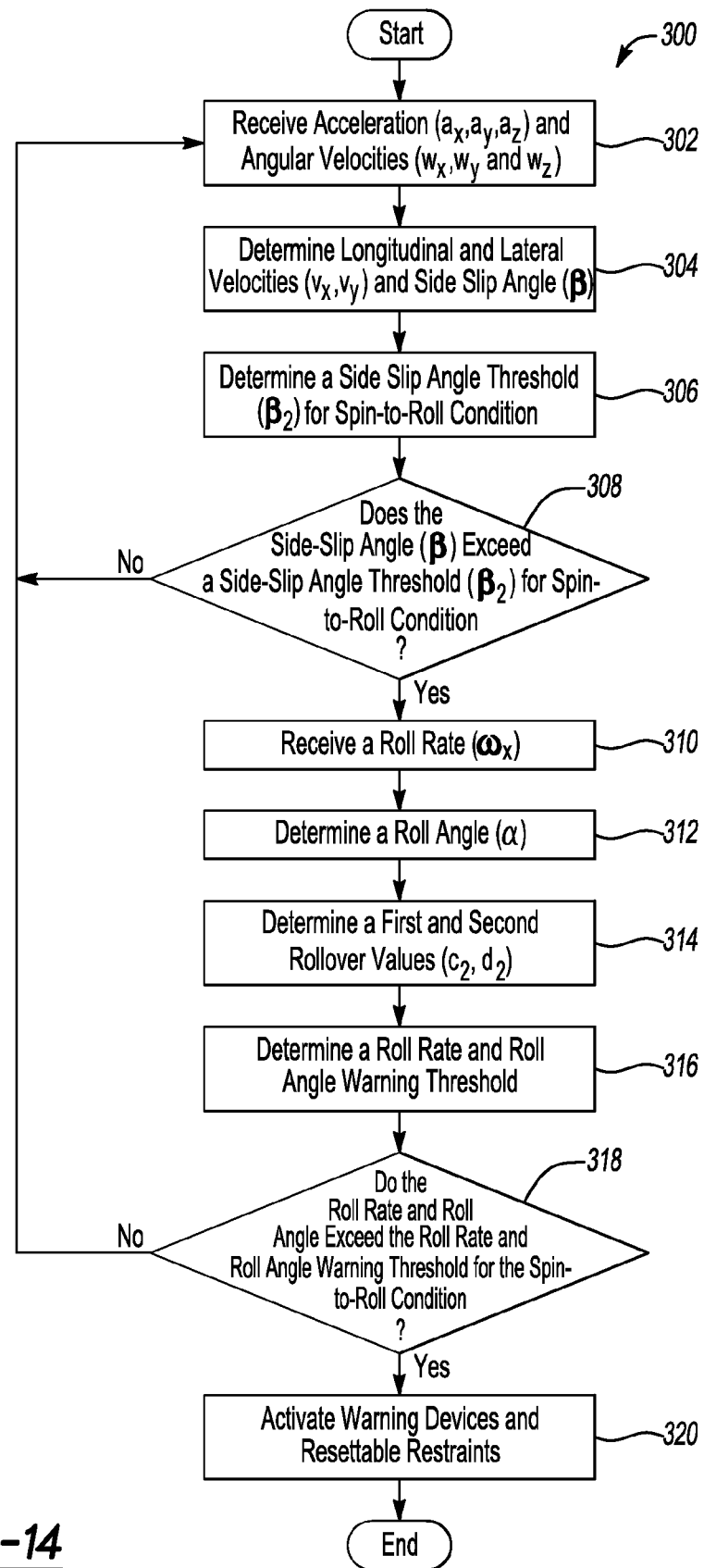
FIG. 14 is an exemplary flow chart illustrating a spin-to-roll condition according to one non-limiting embodiment of the present disclosure.

With reference back to the drawings, FIG. 14 is an exemplary, flow diagram 300 according to one or more embodiments of the present disclosure. However, it should be noted that the flow diagram 300 illustrated in FIG. 14 is merely exemplary, and the operation, function or steps of the method may be performed in a fashion other than the order described herein. The flow diagram 300 illustrated may be used by the controller 14 in order to determine a spin-to-roll condition that may result in a roll-over crash as described above with reference to FIGS. 8-9.

The flow diagram 300 may begin at operation 302 where the controller 14 may receive the longitudinal, lateral, and vertical accelerations ($a_x$, $a_y$, $a_z$) and angular velocities about longitudinal, lateral, and vertical axis ($\omega_x$, $\omega_y$, $\omega_z$) from the IMU sensor 30 or any other suitable sensor system. Upon receiving the acceleration and angular velocity signals, the flow diagram 300 proceeds to operation 304.

In operation 304, the controller 14 may determine the longitudinal and lateral velocities ($v_x$, $v_y$) and the side-slip angle ($\beta$) using Equations (1)-(7) explained above. Upon determining the longitudinal and lateral velocities and the side-slip angle ($\beta$), the flow diagram 300 proceeds to operation 306.

In operation 306, the controller 14 may determine a side-slip angle threshold ($\beta_2$) indicative of a potential spin-to-roll condition. Again, the present disclosure contemplates that the side-slip angle threshold ($\beta_2$) may vary depending upon the make, model, or other characteristics of a particular vehicle. As such, the side-slip angle threshold ($\beta_2$) for a specific vehicle may be established through experimentation and/or mathematical modeling. In addition, the side-slip angle threshold ($\beta_2$) for a spin-to-roll condition may typically be lower than the side-slip angle threshold ($\beta_1$), as determined in operation 106 above, during spin only conditions. Once the side-slip angle threshold ($\beta_2$) is determined, the flow diagram 300 proceeds to operation 308.

In operation 308, the controller 14 may determine if the side-slip angle ($\beta$) exceeds the side-slip angle threshold ($\beta_2$). If the controller 14 determines that the side-slip angle ($\beta$) exceeds the side-slip angle threshold ($\beta_2$), then the flow diagram 300 proceeds to operation 310. However, if the controller 14 does not determine that the side-slip angle ($\beta$) exceeds the side-slip angle threshold ($\beta_2$), the flow diagram 300 proceeds back to operation 302.

In operation 310, the controller 14 may receive updated roll rate ($\omega_x$) from IMU sensor 30 or any other suitable sensor system. Once the roll rate is received by the controller 14 the flow diagram 300 proceeds to operation 312.

In operation 312, the controller 14 may determine the roll angle ($\alpha$). The present disclosure contemplates that in one non-limiting example, the roll angle may be determined by the integration of roll rate ($\omega_x$). Once the roll angle is determined, the flow diagram 300 proceeds to operation 314.

In operation 314, the controller 14 may determine a first and second roll-over value ($c_2$, $d_2$) for a spin-to-roll condition. As stated above, the roll-over values ($c_2$, $d_2$) may be chosen in order to lower or raise the spin-to-roll warning threshold as determined using Equation (20). The present disclosure contemplates that the roll-over values ($c_2$, $d_2$) may vary depending upon the make, model, or other characteristics of a particular vehicle. As such, the roll-over values ($c_2$, $d_2$) for a specific vehicle may be established through experimentation and/or mathematical modeling. The present disclosure contemplates that the first and second roll-over value ($c_2$, $d_2$) for a spin-to-roll condition may generally be lower than the first and second roll-over value ($c_1$, $d_1$) established in operation 206 for a roll-over condition. Once the roll-over values ($c_2$, $d_2$) are established the flow diagram 300 proceeds to operation 316.

In operation 316, the controller 14 may determine the roll rate and roll angle warning threshold for a potential spin-to-roll condition. The present disclosure contemplates that the controller 14 may determine the roll rate and roll angle warning threshold for spin-to-roll condition using Equation (20) and the roll-over values ($c_2$, $d_2$) determined in operation 314. The present disclosure further contemplates that the roll rate and roll angle warning threshold determined in operation 316 may be lower than the roll rate and roll angle warning threshold determined in operation 208. Once the controller 14 determines the roll rate and roll angle warning threshold for the spin-to-roll condition, the flow diagram 300 proceeds to operation 318.

In operation 318, the controller 14 may determine if the roll rate and roll angle warning threshold for spin-to-roll condition has been exceeded. If the controller 14 determines that the roll rate and roll angle warning threshold for spin-to-roll condition is exceeded, the flow diagram 300 proceeds to operation 320. However, if the controller 14 determines that the roll rate and roll angle warning threshold for spin-to-roll condition is not exceeded, the flow diagram 300 proceeds back to operation 302.

In operation 320, the controller 14 may activate the emergency warning systems 52 in order to visually and/or audibly warn the driver of a potential spin-to-roll condition. By visually and/or audibly warning the driver of a potential spin-to-roll condition, the driver may begin braking or adjusting operation of vehicle 10 in order to avoid the potential spin-to-roll condition. In turn, vehicle 10 may not be involved in a spin-to-roll condition that results in a roll-over impact crash. In addition, the controller 14 may activate a number of reversible elements of the frontal, side and/or rollover safety systems 18, 20. For example, the controller 14 may activate the seatbelt pre-tensioning systems 36, 38.

While embodiments of the present disclosure may have been illustrated and described it is not intended that those embodiments illustrated and described are the only embodiments of the present disclosure. Rather, the words used in the above application are words of description rather than limitations and it should be understood that changes may be made to the above description without departing from the spirit and scope of the application. As such, specifically details disclosed are merely representative basis for teaching one skilled in the art to practice the present disclosure.

What is claimed is:

1. A method for activating an advanced warning system in response to a potential crash condition of a vehicle, the method comprising:
    receiving a roll rate signal from a rotational sensor, the roll rate signal being indicative of a roll rate the vehicle overturns in a lateral direction;
    determining a roll angle using the roll rate signal, the roll angle being indicative of the angle the vehicle overturns in a lateral direction;
    determining a first and second roll-over value indicative of the relationship between the roll rate signal and the roll angle; and
    adjusting a roll warning threshold using the first and second roll-over values, the roll warning threshold being adjusted in response to the vehicle experiencing at least a potential roll condition; and
    activating a safety system when the roll rate and roll angle exceed the roll warning threshold, wherein the roll warning threshold is determined using a functional relationship between the roll rate and the roll angle.

2. The method of claim 1 further comprising:
    determining a first and second roll-over value indicative of the relationship between the roll rate signal and the roll angle; and
    adjusting the roll warning threshold using the first and second roll-over values, the roll warning threshold being adjusted in response to the vehicle experiencing a potential spin-to-roll condition.

3. The method of claim 1 further comprising:
    receiving signals indicative of a longitudinal, lateral, and vertical acceleration of the vehicle; and
    receiving signals indicative of an angular velocity about the longitudinal, lateral, and vertical axis of the vehicle.

4. The method of claim 3 further comprising:
determining a longitudinal and lateral velocity of the vehicle using the longitudinal and lateral acceleration signals; and
determining a side slip angle of the vehicle using the arctangent of the ratio between the lateral and longitudinal velocities.

5. The method of claim 4 further comprising:
determining a side slip angle threshold of a vehicle, wherein the side slip angle threshold is indicative of a spin-to-roll condition; and
activating a safety system when the side slip angle exceeds the side slip angle threshold and the roll rate and roll angle exceed the roll warning threshold.

6. The method of claim 5, wherein the step of activating the advanced safety system further includes activating at least one of a visual and audible warning system and activating a seatbelt pre-tensioning system.

7. The method of claim 3, wherein the longitudinal and lateral velocities of the vehicle are determined using the kinematic relationship between the longitudinal, lateral and vertical accelerations and the longitudinal, lateral and vertical angular velocities of the vehicle.

8. A method for activating a safety system in response to a potential crash condition of a vehicle, the method comprising:
receiving a roll rate signal from a rotational sensor, the roll rate signal being indicative of a roll rate the vehicle overturns in a lateral direction;
determining a longitudinal and lateral velocity of the vehicle;
determining a side slip angle of the vehicle using the arctangent of the ratio between the lateral and longitudinal velocities;
determining a roll angle using the roll rate signal, the roll angle being indicative of the angle the vehicle overturns in a lateral direction;
adjusting a roll warning threshold using the first and second roll-over values, the roll warning threshold being adjusted in response to the vehicle experiencing a potential roll condition;
activating a safety system in response to the side slip angle exceeding a side slip angle threshold and the roll rate and roll angle exceeding the roll warning threshold.

9. The method of claim 8 further comprising:
receiving signals indicative of a longitudinal, lateral, and vertical acceleration of the vehicle;
receiving signals indicative of an angular velocity about the longitudinal, lateral, and vertical axis of the vehicle;
determining the longitudinal and lateral velocity of the vehicle using the longitudinal and lateral acceleration signals; and
determining the side slip angle of the vehicle using the arctangent of the ratio between the lateral and longitudinal velocities.

10. The method of claim 9 further comprising:
determining a first and second roll-over value indicative of the relationship between the roll rate signal and the roll angle; and
adjusting the roll warning threshold using the first and second roll-over values, the roll warning threshold being adjusted in response to the vehicle experiencing a potential spin-to-roll condition.

11. The method of claim 9 further comprising:
determining a side slip angle threshold of a vehicle, wherein the side slip angle threshold is indicative of a spin-to-roll condition; and
activating an advanced safety system when the side slip angle exceeds the side slip angle threshold and the roll rate and roll angle exceed the roll warning threshold.

12. A system for activating a safety system in response to a potential crash condition of a vehicle, the system comprising:
a rotational sensor configured to generate a roll rate signal, the roll rate signal being indicative of a roll rate the vehicle overturns in a lateral direction; and
a controller configured to:
determine a roll angle using the roll rate signal, the roll angle being indicative of the angle the vehicle overturns in a lateral direction;
determine a first and second roll-over value indicative of the relationship between the roll rate signal and the roll angle;
adjust a roll warning threshold using the first and second roll-over values, the roll warning threshold being adjusted in response to the vehicle experiencing a potential roll condition
activate a safety system when the roll rate and roll angle exceed the roll warning threshold.

13. The system of claim 12, wherein the controller is further configured to:
determine a first and second roll-over value indicative of the relationship between the roll rate signal and the roll angle; and
adjust the roll warning threshold using the first and second roll-over values, the roll warning threshold being adjusted in response to the vehicle experiencing a potential spin-to-roll condition.

14. The system of claim 12, wherein the rotational sensor is further configured to generate a longitudinal, lateral, and vertical acceleration signal, and the rotational sensor further being configured to generate signals indicative of an angular velocity about the longitudinal, lateral, and vertical axis of the vehicle; and
the controller further being configured to:
determine a longitudinal and lateral velocity of the vehicle using the longitudinal and lateral acceleration signals; and
determine a side slip angle of the vehicle using the arctangent of the ratio between the lateral and longitudinal velocities.

15. The system of claim 14, wherein the controller is further configured to:
determine a side slip angle threshold of a vehicle, wherein the side slip angle threshold is indicative of a spin-to-roll condition; and
activate a safety system when the side slip angle exceeds the side slip angle threshold and the roll rate and roll angle exceed the roll warning threshold.

* * * * *